Figure 1:
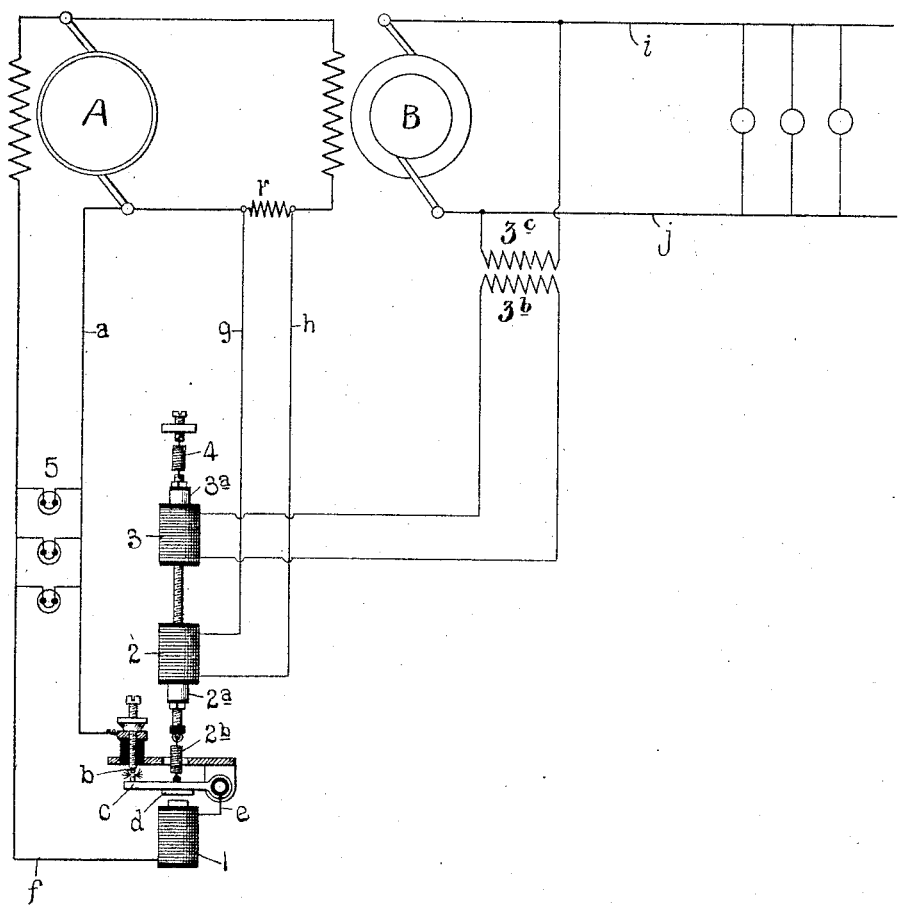

No. 879,887. PATENTED FEB. 25, 1908.
G. S. NEELEY.
METHOD OF REGULATING ELECTRIC GENERATORS.
APPLICATION FILED MAY 9, 1907.

2 SHEETS—SHEET 1.

Witnesses:
Geo. R. Ladson
A. J. McCauley

Inventor,
George S. Neeley.
By Bakewell Cornwall Attys.

THE NORRIS PETERS CO., WASHINGTON, D. C.

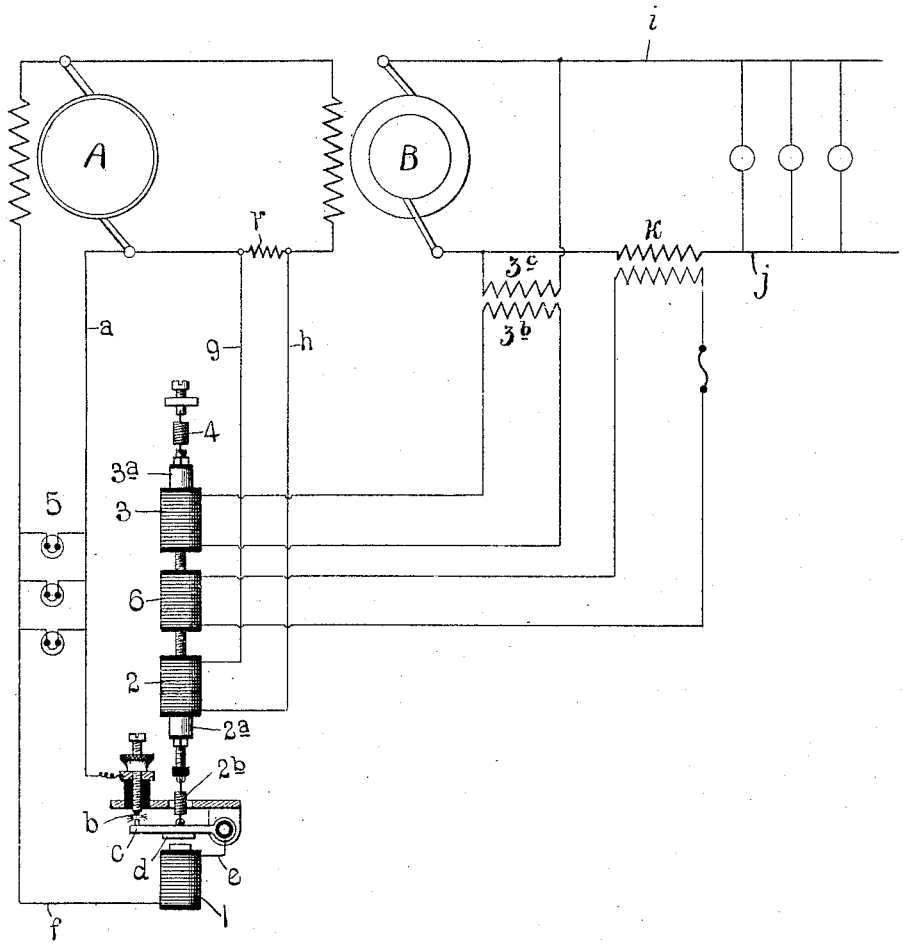

UNITED STATES PATENT OFFICE.

GEORGE S. NEELEY, OF ST. LOUIS, MISSOURI.

METHOD OF REGULATING ELECTRIC GENERATORS.

No. 879,887.          Specification of Letters Patent.          Patented Feb. 25, 1908.

Application filed May 9, 1907. Serial No. 372,773.

*To all whom it may concern:*

Be it known that I, GEORGE S. NEELEY, a citizen of the United States, residing at St. Louis, Missouri, have invented a certain new and useful Improvement in the Method of Regulating Electric Generators, of which the following is a full, clear, and exact description, such as will enable others skilled in the art to which it appertains to make and use the same, reference being had to the accompanying drawings, forming part of this specification, in which—

Figure 1 is a diagrammatic view illustrating my improved method of regulating an electric generator: and Fig. 2 is a similar view illustrating a modified form of regulating system.

This invention relates to a new and useful method of automatically regulating the field density of an electric generator, the object being to maintain a constant voltage in the work circuit or system by a simple arrangement of magnets which control the field resistance by differential action.

In the drawings, A indicates an exciter, and B the generator. The exciter field current passes through wire $a$ to a stationary contact $b$, then arcs across an air gap to a movable contact $c$ suitably pivoted and carrying an armature $d$ under the influence of the core of a magnet 1. The wire $e$ connects the movable contact $c$ with magnet 1, the return wire $f$ from said magnet leading back to the field of the exciter A. $r$ indicates a resistance in series with the field of the generator, which resistance shunts a current through wires $g$—$h$ through a magnet 2 proportional to the strength of the field current of the generator B, and which is also eventually exactly proportional to the field current of the exciter A. Magnet 2 is in the form of a solenoid magnet, the core $2^a$ of which is connected by a spring $2^b$ to the movable contact $c$. The magnet 1, being in series with the field of the exciter, exerts an influence on the armature $d$ to increase the length of the arc between the stationary contact $b$ and the movable contact $c$, while the magnet 2, being energized by the field current of the generator, exerts an influence to shorten the distance between contacts $b$—$c$. Thus the magnets 1 and 2 are in opposition to each other, and, so far as the resistance of the arc between the contacts $b$—$c$ is concerned, it will be maintained constant at all times by the magnets 1 and 2, as long as there is no disturbance of the static equilibrium by a change of voltage in the generator B, in which case the force of magnet 3 is affected. It should be borne in mind that a rise in the field current of the generator B must follow a rise of field current in the exciter field winding and not vice versa. It follows, therefore, as the field current of the generator B must always ultimately be in exact proportion to the field current of the exciter, that no matter how much exciting current the field of the generator B requires the strength of the exciter field current will exactly balance it. This feature is new and results in producing a sensitive yet positive control of the field excitation.

4 indicates a spring whose tension is preferably made adjustable in any suitable manner, which spring is connected to the upper end of solenoid core $3^a$. The purpose of this spring is to yieldingly support the weight of the solenoid cores $3^a$ and $2^a$ so that said cores will be yieldingly suspended, the spring 4 tending, however, to assist the pull of magnet 2 and cause the contact $c$ to approach contact $b$. This spring 4 also serves as a means for adjusting the regulator to give any desired initial line voltage. The action of spring 4 is opposed by magnet 3 operating upon a core $3^a$ connected to the core $2^a$. This magnet 3 is energized by the voltage of the current of the work circuit. Magnet 3 is preferably in the circuit of the secondary winding $3^b$ whose primary $3^c$ is across the lighting or work system.

5 is a resistance across the wires $a$—$f$, said resistance being preferably in the form of special incandescent lamps which provide a resistance having a negative temperature co-efficient.

When the exciter is in operation it will be obvious that the field density and voltage of generator B will be regulated by an arc formed between the contacts $b$—$c$, which constitutes a variable resistance, the increment in which will cause the current to flow through the shunt 5. Thus, conjunctively, the variable resistance and the resistance of the shunt 5 regulate the field density and current output of the exciter A, and thereby directly control the field density and voltage of the generator B.

The magnet 2 is energized by the full intensity of the current supplied to the field of the generator B, or such part of it as may be found necessary to use. The magnet 1 is energized by the intensity of the field current of the exciter A, and is mechanically and magnetically in opposition to the magnet 2.

If a load is thrown on the dynamo B it will increase the intensity of the current flowing in the main line wires $i$—$j$. When the intensity of the current of the working dynamo is increased it results in a slightly decreased voltage across wires $i$—$j$ which correspondingly weakens magnet 3; then this magnet offers less resistance to the spring 4, and consequently said spring will cause contact $c$ to move toward the contact $b$. By this action the resistance in the field circuit of the exciter is thus decreased, when the field of the generator B will be instantly built up proportionately, and the voltage across wires $i$—$j$ will be consequently raised to unity. The actions of spring 4 and magnet 3 are reversed when the dynamo is under full load and the load begins to decrease. In such an event, the force of magnet 3 becomes the stronger, due to the slightly increasing voltage, and thus operates to lengthen the arc between the contacts $b$—$c$, increasing the resistance to the field current of the exciter and this compensates for the decreased load.

My improved regulator will compensate for all ordinary speed variations. If the speed and voltage of the dynamo B is regulated for a given normal, a decrease of speed acts to decrease the voltage across the wires $i$—$j$, and as the opposing forces of the magnet 3 and the spring 4 are equal at normal voltage and speed, a decrease of speed will decrease the voltage, and consequently the force of the magnet 3. Spring 4 will then act automatically to pull the contact $c$ toward the contact $b$, thus reducing the resistance in the field circuit of the exciter as fast as the speed decreases. If the speed exceeds normal it will also increase the voltage of the dynamo above normal, and consequently the extra force of magnet 3 will automatically move the contact $c$ away from the contact $b$.

In Fig. 2 I have illustrated the same system that is shown in Fig. 1, except that I have added a magnet 6 energized by the full intensity of the current supplied to the system, or such part of it as it may be found necessary to use, the series or current transformer $k$ furnishing the means whereby any proportional part of the current of the working circuit may be utilized, and also as a means for reducing the usual high voltage. The purpose of this magnet 6 is to take care of line losses, said magnet assisting the action of the spring 4.

In operation, the contacts $b$ and $c$ never come together, but on the contrary the arc is maintained so as to provide the variable resistance referred to. Thus the contacts $b$—$c$ do not constitute a circuit-maker and breaker as in normal operation they are always separated. Of course, in extreme and unusual cases a condition might exist in the system which would cause contacts $b$—$c$ to very closely approach each other; as, for instance, when a full load is suddenly imposed on the work circuit.

Instead of maintaining the armature $d$, which carries the movable contact $c$, in equilibrium by the opposing forces of the magnets, 1 and 2, it is obvious that the armature $d$ could be maintained in equilibrium by opposing springs of appropriate sensitiveness. I prefer, however, to use the magnets 1 and 2 because the strength of these magnets varies with their energizing sources, and consequently the armature $d$, were it not for disturbing influence of magnet 3 would be held in a position of static equilibrium. The spring 4 and the magnet 3 exert opposing pulls which influence the balanced armature $d$, and it is the strength or weakness of magnet 3 which ultimately determines the movement of contact $c$ toward or away from contact $b$; so that the spring 4 and the magnet 3 constitute supplemental means tending to maintain the armature $d$ in a position of equilibrium.

Having thus described the invention, what is claimed as new and desired to be secured by Letters Patent is:

1. The improvement in the art of regulating dynamo electric machines comprising, in combination, a variable resistance in the field circuit of the exciter, means for effectively maintaining the said variable resistance by opposing magnets, one of which is energized by the field current of the exciter, and the other by the field current of the generator, and means energized by the work circuit or system for disturbing the balance between said opposing magnets; substantially as described.

2. The improvement in the art of regulating dynamo electric machines which consists in the combination of the field circuit of the exciter and the field circuit of the generator, magnets energized by each of said circuits respectively, said magnets being opposed to each other and maintaining in equilibrium between them an arc in series with the field of the exciter, means energized by the work circuit or system for disturbing said equilibrium, said means tending to increase said arc and with it the resistance in the field of the exciter, and other means in opposition to said last mentioned means, which other means tends to decrease said arc; substantially as described.

3. The improvement in the art of regulating dynamo electric machines comprising a variable resistance in series with the field of the exciter, a shunt resistance 5, which shunt resistance has a negative temperature coefficient, opposing magnets for maintaining said variable resistance, said opposing magnets being energized respectively by the field current of the exciter and by the field current of the generator, mechanical means which tend at all times to decrease said variable resistance, and magnetic means in opposition to said mechanical means, said magnetic means being energized by the work circuit of the system and tending to increase said variable resistance; substantially as described.

4. The improvement in the art of regulating dynamo electric machines, comprising a variable resistance in the field circuit of the exciter, said variable resistance being controlled by a movable element, in combination with differential coils for maintaining said movable element in a position of equilibrium one of which coils is energized by the field current of the exciter and the other by the field current of the generator, and auxiliary means energized by the work circuit of the system for disturbing the equilibrium established by said differential coils; substantially as described.

5. The improvement in the art of regulating dynamo electric machines, the combination with a variable resistance in the field circuit of the exciter, a movable element for varying said resistance, magnets energized by the intensities of the field currents of the exciter and the generator respectively for maintaining said movable element in a position of equilibrium, and means energized by the current output of the generator for disturbing said equilibrium and for moving said movable element; substantially as described.

6. The improvement in the art of regulating dynamo electric machines comprising, in combination, a variable resistance in the form of an arc in the field circuit of the exciter, a movable element for varying said arc, magnets energized by the intensities of the field currents of the exciter and the generator respectively for maintaining said movable element in a position of equilibrium, means energized by the current output of the generator for disturbing said equilibrium and for moving said movable element, and a mechanically yielding force operating to assist the magnet energized by the field current of the dynamo; substantially as described.

In testimony whereof I hereunto affix my signature in the presence of two witnesses, this sixth day of May, 1907.

GEORGE S. NEELEY.

Witnesses:
F. R. CORNWALL,
LENORE WILSON.